United States Patent [19]

Cooper et al.

[11] 4,226,761

[45] Oct. 7, 1980

[54] POLYPHENYLENE ETHER RESIN COMPOSITIONS CONTAINING POLYSILOXANE-MODIFIED ALKENYL AROMATIC RESINS

[75] Inventors: Glenn D. Cooper, Delmar; William R. Haaf, Voorheesville; Howard A. Vaughn, Jr., Schenectady, all of N.Y.

[73] Assignee: General Electric Company, Pittsfield, Mass.

[21] Appl. No.: 963,800

[22] Filed: Nov. 27, 1978

[51] Int. Cl.³ .............................................. C08L 71/04
[52] U.S. Cl. .............................. 260/42.18; 260/42.26; 260/45.7 P; 260/45.7 R; 260/45.9 NP; 525/63; 525/392
[58] Field of Search ............ 525/63, 392; 260/827, 260/42.26, 42.18, 45.7 P, 45.7 R, 45.9 NP

[56] References Cited

U.S. PATENT DOCUMENTS

| | | | |
|---|---|---|---|
| 3,737,479 | 6/1973 | Haaf | 260/827 |
| 3,879,491 | 4/1975 | Lindsey et al. | 260/827 |
| 3,960,985 | 6/1976 | Cooper | 260/827 |

OTHER PUBLICATIONS

Saam, J. C.; *Toughening Polystyrene with Silicone Rubber*, SPE Journal, Apr. 1973, vol. 29, pp. 58-61.

*Primary Examiner*—Wilbert J. Briggs, Sr.
*Attorney, Agent, or Firm*—Morgan, Finnegan, Pine, Foley & Lee

[57] ABSTRACT

Novel compositions are disclosed which include a polyphenylene ether resin and an alkenyl aromatic resin modified with a polysiloxane in the form of small rubber-like particles. Also included within the scope of this invention are reinforced and flame-retardant compositions of the polyphenylene ether resin and the alkenyl aromatic resin modified with a polysiloxane.

23 Claims, No Drawings

POLYPHENYLENE ETHER RESIN COMPOSITIONS CONTAINING POLYSILOXANE-MODIFIED ALKENYL AROMATIC RESINS

This invention relates to improved compositions of a polyphenylene ether resin and an alkenyl resin that is modified with a polysiloxane in the form of small rubber-like particles. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. Nos. 3,337,499; Blanchard et al., 3,219,626; Laakso et al., 3,342,892; Borman, 3,344,116; Hori et al., 3,384,619; Faurote et al., 3,440,217; and disclosures relating to metal based catalysts which do not include amines, are known from U.S. Pat. Nos. such as Wieden et al., 3,442,885 (copper-amidines); Nakashio et al., 3,573,257 (metal-alcoholate or -phenolate); Kobayashi et al., 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al., U.S. Pat. No. 3,382,212. Cizek, U.S. Pat. No. 3,383,435 discloses polyphenylene ether-styrene resin compositions. All of the above-mentioned disclosures are incorporated herein by reference.

In the prior art, rubber-modified styrene resins have been admixed with polyphenylene ether resins to form compositions that have modified properties. The Cizek patent, U.S. Pat. Nos. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers is improved.

Nakashio et al. U.S. Pat. No. 3,658,945 discloses that from 0.5 to 15% by weight of an EPDM rubber modified by grafting with styrene may be used to upgrade the impact strength of polyphenylene ether resins. In Copper et al., U.S. Pat. No. 3,943,191 it is disclosed that when the highly unsaturated rubber used in compositions of the type disclosed by Cizek is replaced with EPDM rubber that has a low degree of residual unsaturation, the thermal oxidative stability and color stability are improved. The disclosures of the Nakashio et al. and Copper et al. patents are incorporated herein by reference.

It is disclosed in Haaf, U.S. Pat. No. 3,737,479 that molding resins comprised of polyphenylene ether resins and polysiloxanes are useful. These compositions are prepared by mechanical mixing and, while the compositions are useful for many purposes, they have low notched Izod impact strength. The Haaf patent is incorporated herein by reference.

It has now been found that a composition of a polyphenylene ether resin and an alkenyl aromatic resin modified with a polysiloxane in the form of small rubber-like particles is a very useful thermoplastic molding material having good ductility, good surface appearance, and good impact strength and having excellent processing characteristics and thermal oxidative stability.

It is, therefore, a primary object of this invention to provide improved compositions that are based on polyphenylene ether resin and modified alkenyl aromatic resins.

Another object of this invention is to provide molding compositions and molded articles that are based on a polyphenylene ether resin and an alkenyl aromatic resin modified with a polysiloxane in the form of small rubber-like particles and that have improved thermal oxidative stability.

Still another object of this invention is to provide molding compositions and molded articles that are based on a polyphenylene ether resin and an alkenyl aromatic resin modified with a polysiloxane in the form of small rubber-like particles and that have improved impact strength.

It is also an object of this invention to provide the above-described, improved molding compositions in reinforced and/or flame-retardant embodiments.

DESCRIPTION OF THE INVENTION

The above-mentioned advantages and objects and others will be readily apparent to those skilled in the art by the following compositions.

The compositions of this invention are thermoplastic compositions which comprise:
 (a) a polyphenylene ether resin; and
 (b) an alkenyl aromatic resin that is modified with a polysiloxane in the form of small rubber-like particles.

The preferred polyphenylene ethers are of the formula

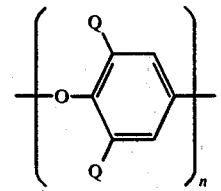

I wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene) ether.

The alkenyl aromatic resin should have at least 25% of its units derived from an alkenyl aromatic monomer of the formula

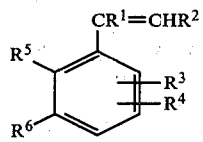

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, bromostyrene, chlorostyrene, α-methylstyrene, vinylxylene, divinylbenzene, vinyl naphthalene, and vinyl-toluene.

The alkenyl aromatic monomer may be copolymerized with materials such as those having the general formula

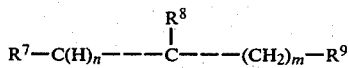

wherein the dotted lines each represent a single or a double carbon to carbon bond; $R^7$ and $R^8$ taken together represent a

linkage; $R^9$ is selected from the group consisting of hydrogen, vinyl, alkyl of from 1 to 12 carbon atoms, alkenyl of from 1 to 12 carbon atoms, alkylcarboxylic of from 1 to 12 carbon atoms, and alkenylcarboxylic of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkenyl aromatic resins include, by way of example, homopolymers such as homopolystyrene and poly(-chlorostyrene), and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene-acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. Nos. 2,971,939, 3,336,267, and 2,769,804, all of which are incorporated herein by reference.

The useful polysiloxanes are the high molecular weight polymers of the formula

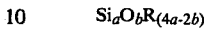

wherein a and b are each an integer of from about 50 to about 200,000 and a/b is between about 0.95 and about 1.05. More specifically, the useful polysiloxanes include those of the formula

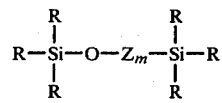

wherein Z represents a group of formula

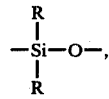

and the variable m is an integer of such a value that the polysiloxane, after grafting and cross-linking, has rubber-like properties, preferably an integer of from about 50 to about 200,000. A small number, preferably less than 10%, of the Z groups may be replaced by branching groups of formula

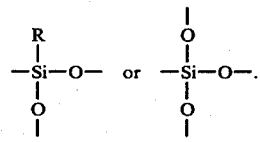

Some of the R groups, which can be the same or different, must be capable of (1) grafting to an alkenyl aromatic resin during polymerization and (2) forming crosslinks so that the final product contains discrete rubbery particles comprised of the polysiloxane and polysiloxane graft copolymer, with occlusion of alkenyl aromatic resin, in a matrix of an alkenyl aromatic resin, such as polystyrene. Therefore, at least some of the R groups, preferably at least one percent, are selected from the group of unsaturated hydrocarbons having from one to about 10 carbon atoms such as vinyl, allyl, and cyclohexenyl groups. For example, R could be a 2-methyl allyl, 2-butenyl or 3-butenyl group. Other R groups can be alkyl or aryl groups having from one to about 10 carbon atoms, being unsubstituted or substituted by one or more cyano, nitro, or amino groups or halogen atoms. Exemplary R groups include methyl, phenyl, cyanoethyl, cyanopropyl, aminobutyl, chlorophenyl, trifluoropropyl, tetrachlorophenyl, chloropropyl, and the like.

The alkenyl aromatic resin modified with a polysiloxane in the form of small rubber-like particles may be prepared by dissolving the polysiloxane in the alkenyl aromatic monomer and polymerizing the mixture, preferably in the presence of a free-radical initiator, until 90-100% by weight of the alkenyl aromatic monomer has been reacted to form the alkenyl aromatic resin modified with polysiloxane in the form of small rubber-like particles. See, for example, Saam et al., "Toughening Polystyrene With Silicone Rubber," *SPE Journal*, Vol. 29, No. 4, April 1973, incorporated herein by reference. Preferred modified alkenyl aromatic resins will include from about 4 to about 25% by weight of polysiloxane in the form of small rubber-like particles, based on the weight of the modified alkenyl aromatic resin. The modified alkenyl aromatic monomer will be comprised of polysiloxane rubber particles, partially cross-linked and grafted with the alkenyl aromatic monomer.

Components (a) and (b) are combinable in a fairly wide range of proportions. Preferably, the compositions of this invention will comprise from about 10 to about 95 percent by weight of polyphenylene ether resin (a) and from about 90 to about 5 parts by weight of alkenyl aromatic resin modified with a polysiloxane in the form of small rubber-like particles (b), based on the weight of the total composition.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 20 to about 95 percent by weight and the filler will comprise from about 80 to about 5 percent by weight, based on the weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 5 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70 to 80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastic compositions, as defined above, by modifying the composition to include a flame-retardant additive in a minor proportion but in an amount at least sufficient to render the composition non-burning or self-extinguishing. The flame-retardant additives useful in this invention comprise a family of chemical compounds well known to those skilled in the art. Such flame-retardant additives include a halogenated organic compound, a halogenated organic compound in admixture with an antimony compound, elemental phosphorus, a phosphorus compound, compounds containing phosphorus-nitrogen bonds, or a mixture of two or more of the foregoing.

Among the useful halogen-containing compounds are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds for this invention are aromatic halogen compounds such as halogenated diphenyl ethers having from 2 to 10 halogen atoms per molecule, or a mixture of at least two of the foregoing. Especially preferred is decabromodiphenylether, alone or mixed with antimony oxide.

In general, the preferred phosphorous compounds are selected from the group of phosphates, phosphonates, and phosphine oxides.

The preferred phosphate is triphenyl phosphate. It is also preferred to use triphenyl phosphate in combination with hexabromobenzene and, optionally, antimony oxide. Especially preferred is a composition comprised of mixed triaryl phosphates with one or more isopropyl groups on some or all of the aryl rings, such as Kronitex 50 supplied by Food Machinery Corporation.

Other flame-retardant additives are known to those skilled in the art. See, for example, Cooper et al., U.S. Pat. No. 3,943,191, incorporated herein by reference.

In general, however, the amount of additive will be from about 0.5 to 50 parts by weight per hundred parts of components (a) and (b). A preferred range will be from about 1 to 25 parts, and an especially preferred range will be from about 3 to 15 parts of additive per hundred parts of (a) and (b). Smaller amounts of compounds highly concentrated in the elements responsible for flame retardance will be sufficient, e.g., elemental red phosphorus will be preferred at about 0.5 to 10 parts by weight per hundred parts of (a) and (b), while phosphorus in the form of triphenyl phosphate will be used at about 3 to 25 parts of phosphate per hundred parts of (a) and (b), and so forth. Halogenated aromatics will be used at about 2 to 20 parts and synergists, e.g., antimony oxide, will be used at about 1 to 10 parts by weight per hundred parts of components (a) and (b).

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., ⅛" to 1" in length, and preferably less than ¼" in length, and put into an extrusion compounder with (a) the polyphenylene ether resin, (b) the alkenyl aromatic resin modified with a polysiloxane in the form of small rubber-like particles, and (c) the flame-retardant additive(s), to produce molding pellets. The fibers are shortened and predispersed in the process, coming out at less than 1/16" long. In another procedure, glass filaments are ground or milled to short lengths, are mixed with the polyphenylene ether resin, the polysiloxane-modified alkenyl aromatic polymer, and optionally, flame-retardant additive(s), by dry blending, and then are either fluxed on a mill and ground, or are extruded and chopped.

In addition, compounding should be carried out to insure that the residence time in the machine is short; that the temperature is carefully controlled, that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLE I

Preparation of Polysiloxane-Polystyrene Graft Copolymers

A polystyrene modified with a polysiloxane in the form of small rubber-like particles, was prepared. The polysiloxane used was a high molecular weight gum wherein 13.5 mole percent of the repeat units were methyl vinyl siloxy units and the remainder were dimethyl siloxy units. The gum contained a small amount of a trimethylsiloxy group as a chainstopper.

A solution of 81.5 g of the polysiloxane gum in 919 g of styrene was transferred, under nitrogen, to a one gallon stainless stell reaction vessel, and 1.0 g of tert-butyl peracetate was added. The system was purged with nitrogen, and the solution was heated, with vigorous stirring, for three hours at 100° C. The polymer was suspended in 1500 ml of water containing 4.0 g of poly(-vinyl alcohol) and 3.0 g of gelatin, 8.0 g of di-tert-butyl peroxide was added, and the mixture was heated for one hour at 100° C., for two hours at 120° C., for one hour at 140° C., and for two and one half hours at 155° C. The beads of polysiloxane-polystyrene graft copolymer were filtered off, washed with water, and dried.

Examination by optical microscopy and by transmission electron microscopy showed the structure typical of rubber-toughened polystyrene, with particles of the polysiloxane on the order of one micron in diameter, with inclusions of polystyrene, in a matrix of polystyrene. The product contained 13.5% of toluene-insoluble gel, with a swelling index, in toluene, of 4.6.

EXAMPLE II

Fifty parts of poly(2,6-dimethyl-1,4-phenylene) ether, 50 parts of grafted copolymer prepared according to Example I, 1 part of tridecyl phosphite, 3 parts of triphenyl phosphate, 1.5 parts of polyethylene, 0.15 parts of zinc sulfide, and 0.15 parts of zinc oxide were mixed and extruded at 575° F. in a 28-mm twinscrew extruder. The extruded pellets were molded at 520° F. into standard test pieces on a 3 oz. Newbury injection molding machine. The product had Gardner impact strength of 150 in. lbs. Izod impact strength—2.5 ft. lbs/in of notch (⅛"), tensile strength of 8800 p.s.i., and a heat distortion temperature of 258° F.

For comparison a similar composition was prepared by mechanical blending and coextrusion of 400 g of poly(2,6-dimethyl-1,4-phenylene) ether, 368 g of polystyrene homopolymer (Dylene 8G available from Koppers Co., Inc.), 32 g of organopolysiloxane, 12 g of polyethylene, 24 g of triphenyl phosphate, 8 g of tridecyl phosphite, 1.2 g of zinc sulfide, and 1.2 g of zinc oxide. The product had Izod impact strength of only 0.9 ft.lbs/in. of notch and Gardner impact strength less than 5 in-lbs.

EXAMPLE III

Sixty parts of poly(2,6-dimethyl-1,4-phenylene) ether, 40 parts of grafted copolymer prepared according to Example I, 1 part of tridecyl phosphite, 6 parts of triphenyl phosphate, 0.15 parts of zinc sulfide, and 0.15 parts of zinc oxide were extruded at 590° F. and molded at 540° F., as described in Example I. A second, similar composition was prepared by mechanical mixing of the organosiloxane, poly(2,6-dimethyl-1,4-phenylene), ether, polystyrene homopolymer, and extruded, along with the tridecyl phosphite, triphenyl phosphate, zinc sulfide, and zinc oxide.

Properties of the two compositions are compared in the table below:

TABLE 1

| Property | Example III | C-1* |
|---|---|---|
| Izod Impact Strength (ft lbs/in. of notch) | 1.5 | 1.0 |
| Gardner Impact Strength (in. lbs) | 125 | <5 |
| Gloss No. | 61 | 40 |
| Heat Distortion Temperature(°F.) | 271 | 264 |

*Control, ingredients mechanically mixed.

EXAMPLE IV

Another composition similar to Example III but having FG-834 (a polybutadiene-modified polystyrene available from Foster Grant) in place of the grafted polysiloxane-polystyrene copolymer, was prepared. This composition was extruded at the same temperature as the composition of Example III, with the feed rate adjusted to maintain the same torque. The composition comprised of FG-834 extruded at a rate of 60 g/min while the composition comprised of the grafted polysiloxane-polystryene copolymer extruded at the rate of 80 g/min.

It can be seen from the above that thermoplastic molding compositions prepared according to this invention have improved impact strength. They also demonstrate improved surface appearance and improved processability.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. A thermoplastic molding composition which, after molding, has good impact resistance, said composition comprising:
   (a) a polyphenylene ether resin; and
   (b) an alkenyl aromatic resin that is modified with a polysiloxane in the form of small rubber-like particles by polymerizing alkenyl aromatic monomer in the presence of the polysiloxane.

2. The molding composition of claim 1 wherein the polyphenylene ether resin is selected from the compounds of the formula:

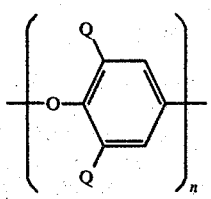

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

3. The molding composition of claim 1 wherein the alkenyl aromatic resin is prepared from a monomer selected from the group consisting of styrene, α-methylstyrene, bromostyrene, chlorostyrene, divinylbenzene, and vinyltoluene.

4. The molding composition of claim 1 wherein the polysiloxane is a compound of the formula

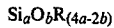

wherein a and b are each integers of from about 50 to about 200,000 and a/b is between about 0.95 and 1.05, and R, which can be the same or different, is selected from the group of unsaturated hydrocarbons having from one to about 10 carbon atoms, and unsubstituted or substituted alkyl and aryl groups having from one to about 10 carbon atoms, at least one percent of the R groups being unsaturated hydrocarbon groups.

5. The molding composition of claim 1 wherein the polysiloxane is a compound of the formula

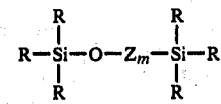

wherein m is an integer of from about 50 to about 200,000; Z represents a group of formula

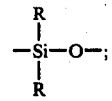

and R, which can be the same or different, is selected from the group of unsaturated hydrocarbons having from one to about 10 carbon atoms, and unsubstituted or substituted alkyl and aryl groups having from one to about 10 carbon atoms, at least one percent of the R groups being unsaturated hydrocarbon groups.

6. The molding composition of claim 1 wherein the polysiloxane is a compound of the formula

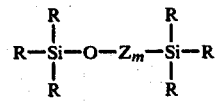

wherein m is an integer of from 50 to about 200,00; Z represents a group of formula

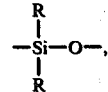

a small number of the groups being replaced by groups of formula

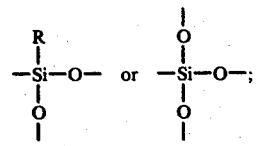

and R, which can be the same or different, is selected from the group of unsaturated hydrocarbons having from one to about 10 carbon atoms, and unsubstituted or substituted alkyl and aryl groups having from one to about 10 carbon atoms, at least one percent of the R groups being unsaturated hydrocarbon groups.

7. The molding composition of claims 4, 5, or 6 wherein the unsaturated R group is a vinyl, allyl, or cyclohexenyl group.

8. The molding composition of claim 7 wherein the unsubstituted or substituted alkyl and aryl R group is a methyl, phenyl, cyanoethyl, cyanopropyl, aminobutyl, chlorophenyl, trifluoropropyl, tetrachlorophenyl, or chlorophenyl group.

9. The molding composition of claim 1 wherein said composition includes a reinforcing amount of an inorganic reinforcing filler.

10. The molding composition of claim 9 wherein said composition includes 5 to 80% by weight of fibrous glass filaments, based on the total weight of the composition.

11. The composition of claim 1 wherein said composition includes a flame-retardant amount of a flame-retardant additive.

12. The molding composition of claim 11 wherein said flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

13. A thermoplastic molding composition which, after molding has good impact strength, said composition comprising:
   (a) from 10 to 95% by weight of a polyphenylene ether resin; and
   (b) from 90 to 5% by weight of an alkenyl aromatic resin that is modified with a polysiloxane in the form of small rubber-like particles by polymerizing alkenyl aromatic monomer in the presence of the polysiloxane.

14. The composition of claim 13 wherein said polyphenylene ether resin is poly(2,6-dimethyl-1,4-phenylene) ether.

15. The composition of claim 13 wherein said alkenyl aromatic resin is styrene and said polysiloxane is present between about 4 and about 25% by weight of styrene and polysiloxane combined.

16. A thermoplastic molding composition which, after molding has good impact strength, said composition comprising:
   (a) from 10 to 95% by weight of a polyphenylene ether resin;
   (b) from 90 to 5% by weight of an alkenyl aromatic resin that is modified with a polysiloxane in the form of small rubber-like particles by polymerizing alkenyl aromatic monomer in the presence of the polysiloxane; and
   (c) a reinforcing amount of an inorganic reinforcing filler.

17. The composition of claim 16 wherein said polyphenylene ether resin is poly(2,6-dimethyl-1,4-phenylene) ether.

18. The composition of claim 16 wherein said reinforcing filler comprises from 5 to 80% of fibrous glass filaments, based on the total weight of the composition.

19. A thermoplastic molding composition which, after molding, has good impact strength, said composition comprising:
   (a) from 10 to 95% by weight of a polyphenylene ether resin;
   (b) from 90 to 5% by weight of an alkenyl aromatic resin that is modified with a polysiloxane in the form of small rubber-like particles by polymerizing alkenyl aromatic monomer in the presence of the polysiloxane; and
   (c) a flame-retardant amount of a flame-retardant additive.

20. The composition of claim 19 wherein said flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

21. The molding composition of claim 19 wherein said flame-retardant additive comprises a mixture of an organic bromine-containing compound with antimony oxide.

22. The composition of claim 19 wherein said flame-retardant additive is triphenylphosphate.

23. The composition of claim 19 wherein said flame-retardant additive is comprised of a mixture of triaryl phosphates wherein one or more aryl groups are substituted by one or more isopropyl groups.

* * * * *